(12) United States Patent
Li et al.

(10) Patent No.: US 11,492,429 B2
(45) Date of Patent: Nov. 8, 2022

(54) LONG-CHAIN BRANCHED ETHYLENE COPOLYMER WITH NOVEL COMPOSITION DISTRIBUTION AND FILMS FORMED FROM THE SAME

(71) Applicant: Formosa Plastics Corporation, USA, Livingston, NJ (US)

(72) Inventors: Peng Li, Sugar Land, TX (US);
Ming-Yung Lee, Port Lavaca, TX (US);
Tieqi Li, Port Lavaca, TX (US);
Honglan Lu, Port Lavaca, TX (US)

(73) Assignee: Formosa Plastics Corporation, U.S.A., Livingston, NJ (US)

( * ) Notice: Subject to any disclaimer, the term of this patent is extended or adjusted under 35 U.S.C. 154(b) by 0 days.

(21) Appl. No.: 16/894,269

(22) Filed: Jun. 5, 2020

(65) Prior Publication Data

US 2021/0380736 A1    Dec. 9, 2021

(51) Int. Cl.
*C08F 210/16* (2006.01)
*C08F 10/02* (2006.01)
*C08J 5/18* (2006.01)

(52) U.S. Cl.
CPC ............... *C08F 210/16* (2013.01); *C08J 5/18* (2013.01); *C08F 2500/12* (2013.01); *C08F 2500/17* (2013.01); *C08F 2500/37* (2021.01); *C08J 2323/08* (2013.01)

(58) Field of Classification Search
CPC .... C08F 210/16; C08F 10/02; C08F 2500/37; C08F 2500/17; C08F 2500/12; C08F 2500/09
See application file for complete search history.

(56) References Cited

U.S. PATENT DOCUMENTS

| | | | |
|---|---|---|---|
| 5,015,693 A | 5/1991 | Duchesne et al. | |
| 5,508,319 A | 4/1996 | DeNicola, Jr. et al. | |
| 6,187,423 B1 | 2/2001 | Maeger et al. | |
| 6,485,662 B1 | 11/2002 | Neubauer et al. | |
| 6,992,034 B2 | 1/2006 | Xu et al. | |
| 7,582,712 B1* | 9/2009 | Xu | C08F 10/00 502/103 |
| 7,618,913 B2 | 11/2009 | Xu et al. | |
| 7,651,969 B2* | 1/2010 | Kong | C08F 10/00 502/116 |
| 8,541,519 B2 | 9/2013 | Demirors et al. | |
| 8,629,217 B2 | 1/2014 | Yang et al. | |
| 8,846,188 B2* | 9/2014 | Fantinel | C08F 10/00 428/220 |
| 8,957,158 B2* | 2/2015 | Fantinel | C08J 5/18 525/240 |
| 8,993,693 B2 | 3/2015 | Lu et al. | |
| 9,068,033 B2* | 6/2015 | Fiscus | C08L 23/0815 |
| 9,346,897 B2 | 5/2016 | Cui et al. | |
| 9,487,608 B2* | 11/2016 | Lu | C08F 210/16 |
| 9,718,907 B2* | 8/2017 | Ding | C08F 210/16 |
| 9,815,925 B2* | 11/2017 | Lam | C08J 5/18 |
| 10,358,506 B2* | 7/2019 | Ding | C08F 210/16 |
| 10,435,527 B2* | 10/2019 | Praetorius | C08F 210/16 |
| 2011/0212315 A1* | 9/2011 | Fantinel | C08F 10/00 526/348 |
| 2013/0131297 A1 | 5/2013 | Yang et al. | |
| 2015/0125645 A1 | 5/2015 | Cheng et al. | |
| 2015/0376311 A1* | 12/2015 | Kababik | C08F 210/16 206/524.6 |
| 2017/0015768 A1 | 1/2017 | Mariott et al. | |
| 2019/0352439 A1* | 11/2019 | Xu | C08F 4/6192 |

FOREIGN PATENT DOCUMENTS

| | | | | |
|---|---|---|---|---|
| CA | 2798855 A1 * | 6/2012 | ............ | C08F 4/6592 |
| CA | 2780508 A1 * | 12/2013 | ............ | C08F 4/6592 |
| CA | 2984825 A1 * | 5/2019 | ............ | C08F 4/6592 |

* cited by examiner

Primary Examiner — Rip A Lee
(74) Attorney, Agent, or Firm — Jones Walker LLP

(57) ABSTRACT

What is disclosed is a Ziegler-Natta catalyzed ethylene and alpha-olefin LLDPE copolymer having a unique composition distribution and long chain-branching. The polymers of the present invention inherently exhibit outstanding melt strength with great bubble stability, sufficient flexibility, excellent gel performance, as well as desirable mechanical properties such as balanced toughness and stiffness, which are desirable properties for thick gauge film applications. Specifically, the polymers of the present invention.

19 Claims, 5 Drawing Sheets

LONG-CHAIN BRANCHED ETHYLENE COPOLYMER WITH NOVEL COMPOSITION DISTRIBUTION AND FILMS FORMED FROM THE SAME

BACKGROUND OF THE INVENTION

1. Field of Invention

The present invention relates to Ziegler-Natta catalyzed ethylene-alpha olefin copolymers having unique composition distribution and desirable long-chain-braining (LCB) with density in the range of about 0.900 to 0.930 g/cc, process for making the same, and articles made of this new composition.

2. Description of Related Art

In various thick gauge polyethylene film applications such as geomembrane, high melt strength and bubble stability during film processing is of significant importance. Attempts to extrude thick geomembrane sheets (i.e., ~100 mil) of pure linear low density polyethylene (LLDPE) by either cast or blown lines have been challenging due to the lack of sufficient melt strength. Conventionally, the bottoms and sides of the geomembrane lined land areas, such as leachate ponds and municipal landfills, are lined with high density polyethylene (HDPE) sheets, which are strong, non-biodegradable, impermeable to air and moisture, and effective as a barrier against leakage of the toxic waste liquid into the soil. However when such material is used to cover the top of the often irregularly shaped material underneath, it's too rigid and lacks of the flexibility and the capacity to stretch and form an effective leak-proof barrier.

Typical LLDPE have low melt strength which adversely affects bubble stability during blown film extrusion and are prone to melt fracture at commercial shear rates. It's well-known that improvement of melt strength can be achieved by blending strategies (U.S. Publ. Patent Nos. 2014/0260016 and 2014/0364545). In the past, various levels of low-density-polyethylene (LDPE) made in a high-pressure polymerization process or high-density-polyethylene (HDPE) with long-chain branching have been blended with LLDPE to increase melt strength, improve shear response and reduce the tendency of melt fracture. However these blends generally have poor mechanical properties as compared with neat LLDPE. It has been a challenge to improve LLDPE processability without sacrificing physical properties.

It's well-known that the processing characteristics of LLDPE can be improved by including a desirable level of long-chain-branching (LCB) through either polymerization process (U.S. Publ. Patent No. 2017/0015768 and U.S. Pat. No. 8,541,519) or post-reactor tailoring. The formation of LCB helps to improve the melt strength of LLDPE resin providing great bubble stability, especially for the manufacture of thick geomembranes sheets. U.S. Publ. Patent Nos. 2013/0,131,297 and 2015/0125645, and U.S. Pat. No. 8,629, 217 disclose that the chemically modified polyethylene composition with dendritic hydrocarbon show excellent melt strength and bubble stability for blown film applications such as thick films used in geomembranes. U.S. Pat. No. 6,187,423 discloses the post-reactor modified Ziegler-Natta catalyzed LLDPE with relatively broad comonomer distribution in geomembrane applications having desirable melt strength. U.S. Pat. No. 9,346,897 discloses peroxide treated Metallocene catalyzed LLDPE for thick gauge film applications. It's well-known that the composition distribution of the base polymers will affect the branch formation. It is critical to select the LLDPE resins of optimal molecular architecture as base polymers for the subsequent post-reactor chemical tailoring to achieve desirable long-chain-branching (LCB).

Various types of LLDPE resin with different molecular architecture are known to the field. Conventional Ziegler-Natta catalyzed ethylene-alpha olefin LLDPE copolymers have both a relatively broad molecular weight distribution and a relatively broad comonomer distribution; the comonomers are predominately incorporated into the low molecular weight polymer molecules or short polyethylene chains whereas the long polyethylene chains or high molecular weight polymer molecules are short of comonomers. The lack of compositional homogeneity is associated with several disadvantages, for example, the "organoleptic" problem caused by low molecular weight materials and suboptimal impact strength. In contrast, single-site catalyst normally produces resins with a narrow composition distribution and narrow molecular weight distribution; the comonomers are uniformly distributed among the polymer chains of different molecular weights in general. The homogeneous architecture, however, is accompanied by some draw-backs in processability and properties. Most single-site catalyzed LLDPE exhibit weak machine-direction tear strength in film and may show adverse processability at the MI useful for geomembrane. The choice of an LLDPE of unique architecture other than the above as the based resin and the optimal post-reactor tailoring result in the polymers having good melt strength, sufficient flexibility, and outstanding physical properties inherently due to the optimal composition distribution and long-chain branching.

For the applications of thick gauge films or sheets made from polyethylene materials by melt extrusion, it is also paramount for the polymers to have low content of gels as much as possible. Gels are constant issues for the production of polyolefin film products. In the worst cases gels can cause film breakage or losing bubble stability. The term gel commonly refers to structure inhomogeneity visible to naked eyes or microscopes shown as imperfection on product or, in worst cases, interrupting the processing. The gels can be polymer of density or molecular weight different from the matrix, the highly branched or crosslinked domains of oxidative origins, clusters of foreign matters, and so on. They can be thermally crosslinked gels, highly oxidized gels, unmixed gels, or contaminants. The presence of such gel domains may lead to deficiencies in the film material itself. It is therefore highly desirable to reduce the occurrence of such gels, in particular to reduce the gels of relatively large sizes.

As such, the LLDPE resins of the present invention have unique composition distribution and chain-branching and post-reactor tailoring. The polymers of the present invention inherently exhibit outstanding melt strength with great bubble stability, sufficient flexibility, excellent gel performance, as well as desirable mechanical properties such as balanced toughness and stiffness, which are used in various thick gauge film applications.

SUMMARY OF THE INVENTION

The present invention discloses a high melt-strength Ziegler-Natta catalyzed ethylene and alpha-olefin copolymer having a unique composition distribution and long-chain branching and with superior physical properties, a process for making the same, and articles made of this composition.

In one embodiment, the LLDPE resin of the present invention exhibits unique comonomer distribution across its entire molecular weight in which comonomers are evenly incorporated into the high molecular weight polymer chains. The resin of this invention has at least 15 wt % of the ethylene copolymer components eluted in TREF at a temperature of 35° C. or lower. The molecular weight distribution of the 35° C. fraction is almost the same as the global molecular weight distribution, while the distribution of the comonomer, though at much higher content, is uniform over the entire molecular weight. In addition, the molecular weight (Mw) of the inventive copolymer resins is substantially constant across all TREF fractions. As an indicator of such unique composition, Mw of the copolymer satisfies the formula:

$$(\text{Mw of } 100° \text{ C.})/(\text{Mw of } 35° \text{ C.})=1.0 \text{ to } 1.5 \tag{1}$$

The polymers of the present invention, prepared with C3 to C8 alpha-olefin comonomers, have a molecular weight distribution(Mw/Mn) of 3.0-5.0, a melt index of between 0.3 and 0.8 dg/min, and a density of between 0.910 and 0.930 g/cc. Zero-shear-viscosity ($h_0$) is in the range of $6 \times 10^4$ to $6 \times 10^6$ Pa*s. Long-chain-branching (LCB) is in the range of about 10 to 50 per million carbon atoms. The base copolymers are polymerized by reacting ethylene and an alpha-olefin comonomer in the presence of titanium-based Ziegler-Natta catalyst in a gas phase reactor process in the range of about 50° C. to about 100° C.

In another embodiment, the LLDPE polymers of the present invention show outstanding gel performance which is critical to thick film applications. Also the zero-shear-viscosity ($\eta°$) of the inventive polymer at 190° C. is in the range of $6 \times 10^4$ to $5 \times 10^5$ Pa*s when the melt index is between about 0.45 and about 0.50 dg/min.

In yet another embodiment, the high melt-strength LLDPE of the present invention has a Oxidative Induction Time (OIT) of at least 150 mins as measured according to ASTM D3895, the ESCR of resin compression plaque has at least 3000 hours according to ASTM D1693, the tensile elongation of resin compression plaque has at least 700% according to ASTM D638, and the tensile strength at yield of resin compression plaque has at least 1500 psi according to ASTM D638.

DETAILED DESCRIPTION

Figure 1:
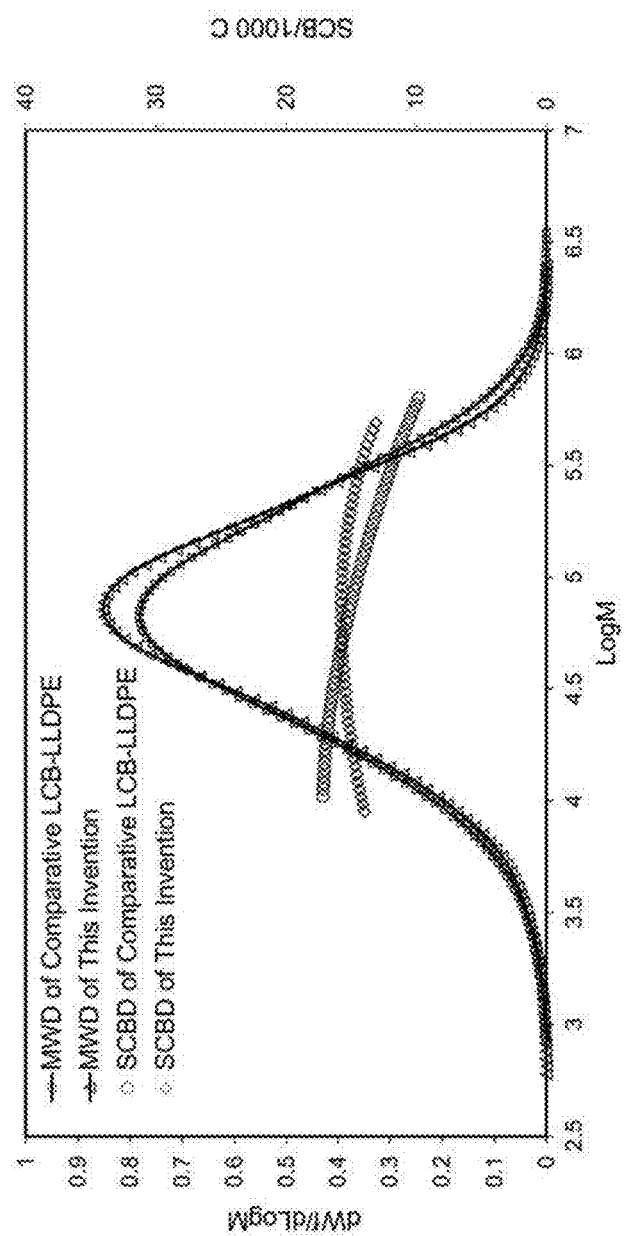
FIG. 1 depicts the novel short chain branching distribution (SCBD) for copolymers of the present invention.

The present invention relates to Ziegler-Natta catalyzed ethylene-alpha olefin copolymers having desirable long-chain-braining (LCB) and novel composition distribution. The LLDPE resins used in the present invention before post-reactor modification are polymerized using an advanced Ziegler-Natta catalyst in a gas-phase fluidized bed reactor.

Catalyst System and Polymerization Process

The catalyst utilized herein is an advanced Ziegler-Natta catalyst modified with non-single-site catalyst ligands and/or interior with a strong Lewis base such as aromatic compounds containing a nitrogen atom. Examples of such catalyst are described in U.S. Pat. Nos. 6,992,034 and 7,618,913, which are incorporated by reference herein.

The LLDPE copolymers of the present invention from ethylene and alpha-olefin were produced in a commercial BP gas phase polymerization process. The copolymers of the present invention may be copolymers of ethylene with one or more $C_3$-$C_{10}$ alpha-olefins. The preferred co-monomers include 4-methyl-1-pentene, 1-hexene, 1-octene and 1-butene. Typically, in a gas phase polymerization process, a continuous cycle is employed wherein one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst or prepolymer under reactive conditions. The gaseous stream is withdrawn from the fluidized bed and recycled back into the reactor. Simultaneously, polymer product is withdrawn from the reactor and fresh monomer is added to replace the polymerized monomer.

The ethylene partial pressure should vary between 10 and 250 psi, preferably between 65 and 150 psi, more preferably between 75 and 140 psi, and most preferably between 90 and 120 psi. More importantly, a ratio of comonomer to ethylene in the gas phase should vary from 0.0 to 0.50, preferably between 0.005 and 0.25, more preferably between 0.05 and 0.20, and most preferably between 0.10 and 0.15. Reactor pressure typically varies from 100 psig to 500 psi. In one aspect, the reactor pressure is maintained within the range of from 200 psig to 500 psi. In another aspect, the reactor pressure is maintained within the range of from 250 psig to 350 psi.

With the unique catalysts used for resins in the present invention, molecular weight may be suitably controlled with hydrogen when the polymerization is carried out at temperatures from about 20 C to about 300 C. This control of molecular weight may be evidenced by a measurable positive change of the melting index ($I_2$). The molecular weight distribution (MWD) of the base polymers prepared in the presence of the catalysts of the present invention, as expressed by the MFR values, varies from about 10 to about 40. MFR is the ratio of the high-load melt index (HLMI or $I_{21}$) to the melt index (MI or $I_2$) for a given resin (MFR=$I_{21}$/$I_2$). The ethylene/I-hexene copolymer having a density of 0.910 g/cc to 0.930 g/cc, in a preferred embodiment, have a melt index ratio ($I_{21}/I_2$) of from greater than about 20 to less than about 30. Copolymer resins produced in accordance with the present invention preferably contain at least about 75 percent by weight of ethylene units. Most preferably, the copolymer resins of the invention contain at least 0.5 weight percent, for example from 0.5 to 25 weight percent of an alpha-olefin.

Structure and Property of High Melt-Strength LLDPE

Geomembranes are very low permeability synthetic membranes, liner or barrier typically used to control fluid migration in a human-made project. The use of polyethylene copolymers in geomembrane is well-known to those familiar with the art. Suitable polyethylene resins for thick-gauge film include conventional linear low density polyethylene (LLDPE), ultralow density polyethylene (ULDPE), and media density polyethylene (MDPE) which could be homopolymers, copolymers, or terpolymers, of ethylene and alpha-olefins. In copolymers, the weight percentage of the alpha-olefins is about 4 to 15% by weight, preferably from 6 to 12% by weight. Applicable alpha-olefin comonomers include propylene, 1-butene, 1-peneteen, 1-hexene, 4-methyl-pentene, and 1-octene. The alpha-olefins range from about C3 to C20, preferably C3 to C10, more preferably from C3 to C8. The resin melt index will typically be between 0.2 and 10 dg/min, preferably between 1 and 5 dg/min, and more preferably between 1 and 2 dg/min. Resin density will be between 0.860 and 0.940 g/cc, preferably between 0.900 and 0.930 g/cc. It's often desirable to have LLDPE with hexane extractable levels below approximately 4 weight percent to minimize the potential for film blocking, high unwind noise, roll telescoping, roll softness and die build-up.

Geomembranes are often made by film blowing of large bubble size or casting of large width and require the resins to have sufficient melt strength. Long-chain branching is hence often a favorable architecture of the resin due to its benefits to the melt strength (e.g., U.S. Pat. No. 9,346,897). The long-chain-branching (LCB) LLDPE resin of the present invention is chemically tailored based on reactor resins that are Ziegler-Natta catalyzed LLDPE copolymers with a unique molecular composition, as described in U.S. Pat. Nos. 8,993,693 and 6,992,034, which are incorporated by reference in their entireties. The reactor ethylene copolymers used in the present invention are produced by reacting ethylene and an alpha-olefin comonomer in the presence of a titanium-based Ziegler-Natty catalyst in a gas-phase process at reaction temperatures in the range of about 50° C. to about 100° C. Such ethylene copolymer resins possess unique composition distribution and distinctive molecular structure. The LLDPE copolymer of the present invention exhibits unique comonomer distribution in that the comonomers are preferentially incorporated onto the high molecular weight polymer chains. The resin of this invention has at least 15 wt % of the ethylene copolymer components eluted in TREF at a temperature of lower than 35° C. The weight average molecular weight (Mw) of the inventive copolymer resin is substantially constant over entire TREF fraction distribution. The resin of this invention being prepared with C3 to C8 alpha-olefins composition has a controlled molecular weight distribution (Mw/Mn) of 2.5-5.0, a melt index of between 0.5 and 5 dg/min, and a density of between 0.910 and 0.930 g/cc.

The LLDPE copolymer of the present invention was polymerized by using an advanced Ziegler-Natta catalyst modified with non-single-site catalyst ligands and/or interior with a strong Lewis base such as aromatic compounds containing a nitrogen atom. The alpha-olefin comonomer is selected from 1-hexene and 1-butene. Typically, ethylene and other alpha-olefins are copolymerized in a gas phase polymerization process in the presence of a titanium-based Ziegler-Natta catalyst and an alkyl-aluminum co-catalyst at an ethylene partial pressure of from 10 psi to 350 psi, and a comonomer to ethylene ratio of 0.01 to 0.50. Examples of such catalyst and polymerization conditions are described in U.S. Pat. Nos. 6,992,034 and 7,618,913, which are incorporated by reference herein in their entireties.

The hexane extractable of the resin of this invention is less than about 2.5 wt %, which is a beneficial feature for processability in film extrusion. Concerns for having high hexane extractable containing polymers in the outermost layers exist because the high hexane extractables are believed to contribute the problem of die build-up during extrusion and a build-up of low molecular weight olefinic material on fabrication equipment. A build-up of low molecular weight olefinic material is undesirable because the film surface may be negatively affected during film extrusion which may results in inconsistency in film physical performance.

Post-reactor chemical modifications can be performed either in a batch reactor or a continuous reactive extrusion process. Modification using a batch reactor is discontinuous. It may allow high conversion of reactant and a good control of reactions. However, it is in general not practical to use in most polyolefin production on large scale. In contrast, modification by reactive extrusion is more difficult to control while possible to be incorporated into the extrusion finishing stage in polyolefin production.

For the present invention, the extrusion modification of the chosen base polymers of unique architecture are achieved with a peroxide compound at a temperature practical for commercial polyolefin extrusion pelletizing. The choice of the peroxide initiator, auxiliary additive and extrusion conditions allow the generation of the peroxide free radicals. The peroxide compound can be any compound containing one or more peroxide groups, suitable examples of which can include, but are not limited to, dicumyl peroxide and dimethyl-di(tert-butylperoxy) hexane peroxide, and the like.

Several techniques in the prior art have been suggested to reduce the number of gels in polyethylene film materials. U.S. Pat. No. 5,508,319 claims to reduce gels utilizing irradiation of polyethylene materials by gamma radiation or e-beam radiation, but such treatment affects resin melt flow characteristics. Another option in U.S. Pat. No. 5,015,693 suggests to add certain fluoropolymer to the polymer melts in the melt extruder. A disadvantage however is that the use of such fluoropolymers leads to the limitation for use in certain applications. Another technique in U.S. Pat. No. 6,485,662 suggests the reduction of gels in polyethylene is the application of a melt screen in a melt extruder. This however has the disadvantage that pressure build-up by the screen results in a loss of productivity. Therefore there is a need to develop polyethylene film product having reduced gel content in a simple and efficient manner without additional complicated treatments.

Melt flow ratio, which is the ratio of high melt flow index (HLMI) to melt flow index (MI) was used as a measure of melt fluidity and a measure of the molecular weight distribution of polymers. The melt flow ratio is believed to be an indication of the molecular weight distribution of the polymer, the high the value, the broader the molecular weight distribution. Composition distribution or short chain branching distribution of polymers, and comonomer content, and molecular weight in each fractionated fraction were determined by TREF and GPC-FTIR with a solvent of TCB. All molecular weight are weight average molecular weight unless otherwise noted. Molecular weights including weight average molecular weight (Mw), number average molecular weight (Mn), and the Z average molar mass (Mz) were measured by Gel Permeation Chromatography (GPC).

Vicat softening temperature was determined in accordance with ASTM D1525. The peak melting point was determined using Differential Scanning Calorimetry (DSC) according to ASTM D3418 at a heating rate of 10° C./min.

The films of the present invention are typically produced by the conventional blown film process. The polymers according to the formulation of the present invention are easily extruded into blown films. Examples of various extruders with a blown film die, air ring, and continuous take off equipment, including but not limited to LabTech blown film line, can be used in producing the films of the present invention.

Examples

The ethylene/1-hexene copolymers of the present invention prior to post-reactor tailoring were polymerized with advanced Ziegler-Natta catalysts in a gas-phase fluidized bed reactor. More detailed resin polymerization information is described in our U.S. Pat. Nos. 8,993,693 and 6,992,034.

In order to provide a better understanding of the foregoing discussion, the following non-limiting examples are offered. Although the examples may be directed to specific embodiments, they are not to be viewed as limiting the invention in any specific respect.

Melt flow index (MI) of polymer was measured at 190° C. according to ASTM D1238. Density was measured according to ASTM D1505. All molecular weights are weight average molecular weight unless others noted. Molecular weights (weight average molecular weight (Mw), number average molecular weight (Mn), and (Mz) were measured by Gel Permeation Chromatography (GPC). Composition distribution or short chain branching of polymers, and comonomer content and molecular weight in each fractionated fraction were determined by Temperature Raising Elusion Fraction (TREF) and GPC-FTIR at a high temperature of 145° C., flow rate of 0.9 mL/min, solvent of TCB, and the concentration of solution of 2.5 mg/Ml.

Melt rheological characterization was performed with frequency sweep on an ARES G2 rheometer by TA Instruments. All tests were run at 190 C with a strain amplitude of 5% and the frequencies of 100 rad/sec to 0.01 rad/sec with intervals of 5 points/decade. The dynamic viscosity as a function of frequency was fitted to the Carreau-Yasuda (CY) viscosity model (P. J. Carreau, Ph.D. thesis, University Wisconsin, 1968) to obtain the zero-shear-viscosity ($\eta_0$). The rate index was fixed at 0.1818 to minimize the uncertainty due to the curve fitting. Polymers having long-branching (i.e., of branches long enough to entangle with other polymer chains) flow significantly different from their linear counterparts. The presence of long-chain branching (LCB) can profoundly affect the processing and crystallization. It is often desirable to incorporate an amount of long-chain-branching into polyethylene resin to achieve certain advantages in processability and physical properties. The LCB level in polyethylene resin samples, expressed as JC-α, was calculated following Janzen and Colby (J. Mol. Struct. 485, 589, 1999) from zero-shear viscosity (ho) and GPC weight-average molecular weight (Mw).

Short chain branching distribution (SCBD) of the copolymer of this invention is shown in FIG. 1. The copolymers have a unique composition distribution in which commoners are incorporated nearly evenly among the entire molecular weight distribution, in contrast to the comparative example of the competitive resin, which is also a Ziegler-Natta catalyzed LLDPE Copolymer.

Figure 2:
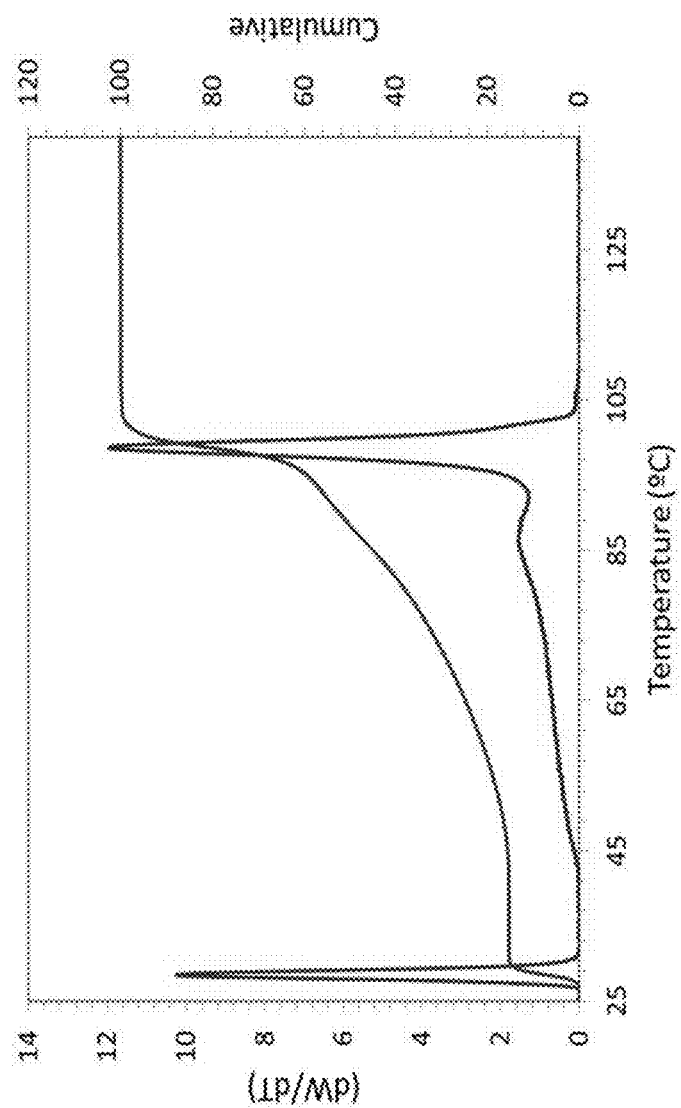
FIG. 2 depicts the TREF fraction below an elution temperature of 35 C for copolymers of the present invention.
Figure 3:
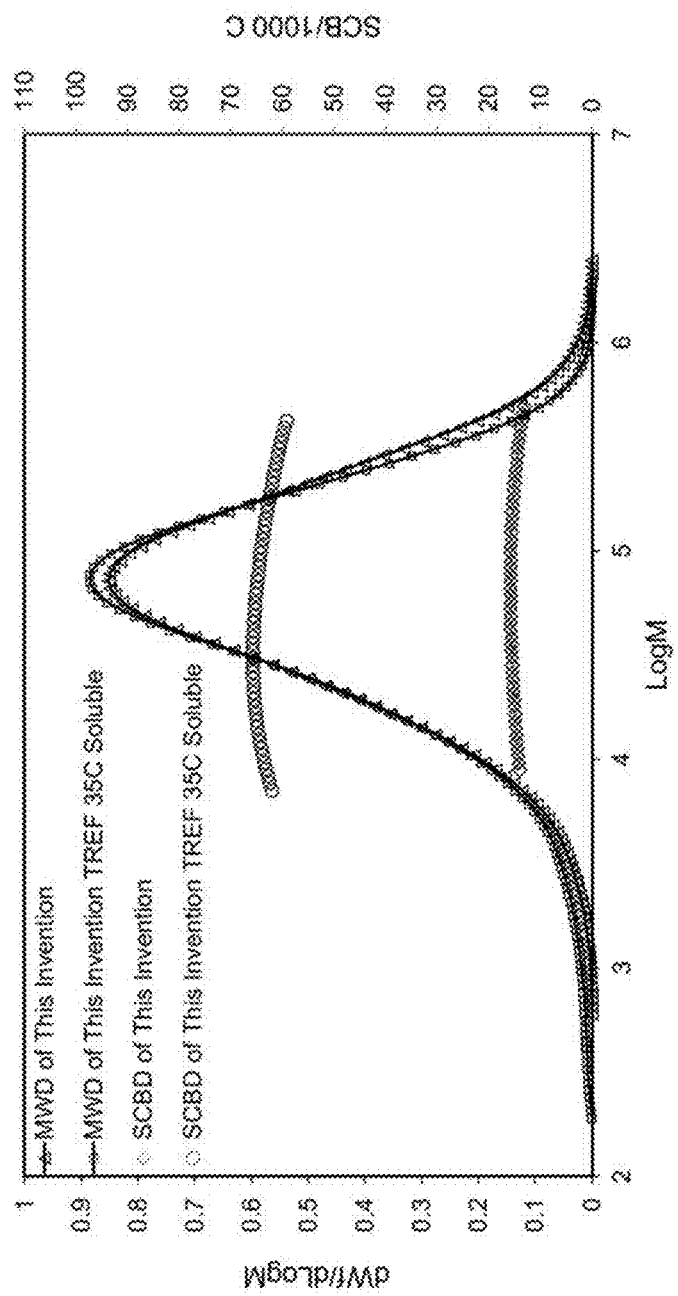
FIG. 3 depicts the similar molecular weight distribution and uniform comonomer distribution of the 35 C TREF fraction of for copolymers of the present invention.
Figure 4:
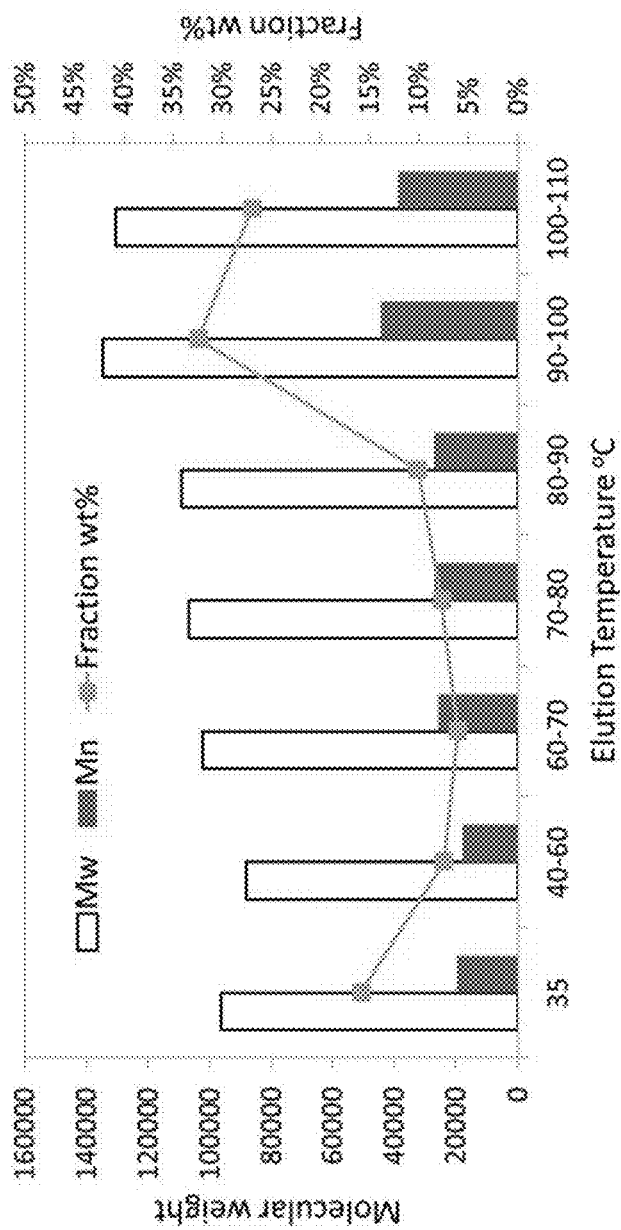
FIG. 4 demonstrates a substantially constant molecular weight across all TREF fractions for copolymers of the present invention.

Temperature Raising Elusion Fraction (TREF) was performed to characterize the molecular architecture of the resin eluted from the TREF column at a given low temperature. TREF results in FIG. 2 indicate that the resins of this invention exhibits that the content of TREF fraction eluted at low temperature of 35 C is as high as 16%, which is a noticeable difference from that of mLLDPE. Moreover, the molecular weight (Mw) of TREF low temperature soluble fraction was found comparable to the global composition per FIG. 3. Furthermore, as shown in FIG. 4, molecular weight of a copolymer of the invention is substantially constant over entire TREF fraction distribution, wherein Mw of the copolymer satisfies the formula:

$$(\text{Mw of } 100° \text{ C.})/(\text{Mw of } 35° \text{ C.}) = 1.0 \text{ to } 1.5 \tag{1}$$

The polymer of the present invention has at least 15% of Temperature Raising Elusion Fraction (TREF) fraction below an elution temperature of 35° C. In general, the high melt-strength polymers of invention are Ziegler-Natta catalyzed ethylene and alpha-olefin copolymer with unique composition distribution and desirable long-chain-branching (LCB). The unique composition features include, but not limited to, a uniform short-chain branching distribution per GPC-FTIR and a substantially constant weight-average molecular weight across the TREF fractions.

Figure 5:
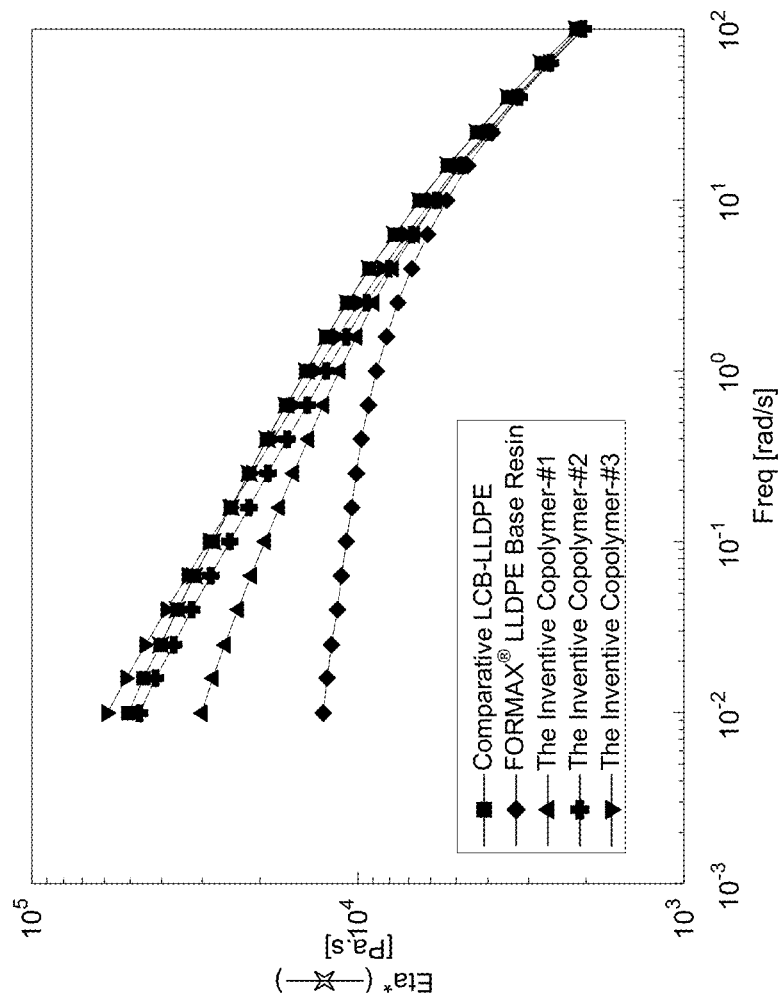
FIG. 5 depicts a dynamic rheology plot (viscosity versus shear rate) at 190° C. for copolymers of the present invention.

FIG. 5 presents a dynamic rheology plot (viscosity versus shear rate) at 190° C. for the resin of the present invention with various MI. Examples of the molecular parameters of the polymers are provided in Table 1 in terms of molecular weight, molecular weight distribution, zero-shear-viscosity ($\eta_0$) and LCB (JC-a). Zero-shear viscosity of the polymers at any given MI is significantly higher than the linear control. In one embodiment, the zero-shear viscosity follows a simple function of MI and LCB level:

$$\eta_0 = k0 * MI^{[n0*(1+z*a)]} \tag{2}$$

where: k0=13017 Pa*s, n0=−1.3884, z=0.062014.

A sample of the inventive resin of 0.35MI would have a zero-shear viscosity of about 20 times higher than its competitive counterpart. The higher $\eta_0$ of the inventive resins at a given MI is an advantage to achieve higher throughput while meeting the melt strength demands of the processes. In general, the ethylene copolymers of this invention have levels of long-chain-branching (LCB) in a range of from about 5 to about 100, from about 5 to about 50, or from about 10 to about 30 LCB per 1 million total carbon atoms.

TABLE 1

| Sample ID | MI g/10 min | Mw g/mol | Mn g/mol | Mz g/mol | Mw/Mn | ZSV ($h_o$) | JC-a [#/$10^6$ $CH_2$] |
|---|---|---|---|---|---|---|---|
| Comparative LCB-LLDPE | 0.35 | 123300 | 30400 | 355900 | 4.1-4.4 | 2.02E+05 | 13-16 |
| FORMAX ® LLDPE Base Resin | 1.0 | 114611 | 31836 | 294990 | 3.6 | 1.31E+04 | ~2 |
| Inventive Copolymer-#1 | 0.50 | 117198 | 31611 | 315591 | 3.7 | 6.36E+04 | 10-12 |
| Inventive Copolymer-#2 | 0.43 | 120865 | 30639 | 339342 | 3.9 | 4.31E+05 | ~24 |
| Inventive Copolymer-#3 | 0.38 | 119912 | 33321 | 325740 | 3.6 | 1.65E+06 | ~42 |

Table 2 shows the examples of the physical properties of the high melt-strength resins of the present invention that have desirable LCB levels. The physical properties of the resins were tested according to the ASTM procedures. The inventive resins exhibit desirable physical properties such as desirable stiffness and flexibility as well as outstanding thermal stability. Flexural modulus of resin compression plaque has at least 55 kpsi according to ASTM D790. OIT has at least 150 mins as measured according to ASTM D3895. Tensile elongation and tensile strength at yield of resin compression plaque has at least 700% and at least 1500 psi, respectively according to ASTM D638. Hardness of resin compression plaque has at least 50 Shore-D according to ASTM D2240. ESCR has at least 3000 hours for both condition B and C according to ASTM D1693.

TABLE 2

| Testing Item | Unit | ASTM | This Inventive Copolymer | | |
|---|---|---|---|---|---|
| MI | g/10 min | D1238 | ~0.50 | ~0.55 | ~0.42 |
| Density | g/cc | D1505 | 0.9191 | 0.9181 | 0.9191 |
| Tensile str. yield | Psi | D638 | 1580 | 1720 | 1590 |
| Tensile elongation at break | % | D638 | 720 | 770 | 710 |
| Flexural modulus | Kpsi | D790 | 67 | 59 | 66 |
| Hardness | Shore D | D2240 | 57 | 53 | 56 |
| Vicat | °C. | D1525 | 100 | 101 | 102 |
| HDT (66 psi) | °C. | D648 | 49 | 47 | 49 |
| OIT | mins | D3895 | 175 | 176 | 185 |
| ESCR (cond. B & C) | hr | D1693 | | >3000 | |
| Gel counts (<425 μm) | #/100 cm² | D7310 | | <20 | |
| Gel counts (>425 μm) | #/100 cm² | D7310 | | <5 | |

In addition, the high melt-strength resin of the present invention exhibits outstanding gel performance which is critical to geomembrane applications. Gel counts with smaller than 425 μm size has less than 20 per 100 cm² and the gel counts with larger than 425 μm has less than 5 per 100 cm², respectively, according to ASTM D7310.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled with the art and having the benefit of the teachings therein. Furthermore, no limitations are intended to the details of construction or design herein shown, other than as described in the claims below. It is therefore evident that the particular illustrative embodiments disclosed above may be altered or modified and all such variations are considered within the scope and sprit of the present invention. Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Whenever a numerical range with a lower limit and an upper limit is disclosed, and number falling within the range is specifically disclose. Moreover, the indefinite articles "a" or "an", as use in the claims, are defined herein to mean one or more than one of the element that it introduces.

What is claimed is:

1. A Ziegler-Natta catalyzed ethylene and alpha-olefin LLDPE copolymer, comprising:
    a) density in a range from about 0.910 g/cc to about 0.930 g/cc;
    b) melt index ($I_2$) in a range from about 0.2 dg/min to about 0.8 dg/min;
    c) melt index ratio ($I_{21}/I_2$) in a range from about 25 dg/min to about 45 dg/min;
    d) polydispersity index (Mw/Mn) in a range from about 3.0 to about 5.0;
    e) polydispersity index (Mz/Mw) greater than 2.5;
    f) peak melting point in a range from about 123° C. to about 127° C.;
    g) at least 15% of temperature raising elution fractionation (TREF) fraction below an elution temperature of 35° C.;
    h) weight average molecular weight (Mw) is substantially constant over an entire TREF fraction distribution, wherein Mw at 100° C. divided by Mw at 35° C. is in a range from about 1.0 to about 1.5;
    i) zero-shear-viscosity ($\eta^0$) at 190° C. is in a range of about $2 \times 10^4$ to about $1 \times 10^7$ Pa·s;
    j) long-chain-branching (LCB) is in a range from about 5 to about 50 per million total carbon atoms.

2. The copolymer of claim 1, wherein gel counts with smaller than 425 μm size has less than 20 per 100 cm², and wherein gel counts with larger than 425 μm has less than 5 per 100 cm², respectively as measured according to ASTM D7310.

3. The copolymer of claim 1, wherein polymer zero-shear-viscosity ($\eta_0$) is a function of melt flow index (MI) and LCB as follows:

$$\eta_0 \geq k0 * MI^{[n0*(1+z*a)]}$$

wherein k0=13017 Pa*s, n0=−1.3884, and z=0.062014.

4. The copolymer of claim 1, wherein the zero-shear-viscosity ($\eta_0$) at 190° C. is in a range of $3 \times 10^4$ to $5 \times 10^5$ Pa-sec when a melt index (MI) is in a range from about 0.30 to about 0.60 dg/min.

5. The copolymer of claim 1, wherein the Mw is in a range from about 80,000 to about 200,000 g/mil; wherein the number average molecular weight (Mn) is in a range from about 30,000 to about 70,000 g/mol; and wherein Z average molar mass (Mz) is in a range from about 300,000 to about 400,000 g/mol.

6. The copolymer of claim 1, wherein the polydispersity index (Mz/Mw) is greater than 2.5 and less than about 3.8.

7. The copolymer of claim 1, wherein the polydispersity index (Mz/Mw) is greater than 2.5 and less than about 3.5.

8. The copolymer of claim 1, wherein the polydispersity index (Mz/Mw) is greater than 2.5 and less than about 3.0.

9. The copolymer of claim 1, wherein the copolymer has homopolymer content less than about 10%.

10. The copolymer of claim 1, wherein a TREF soluble fraction eluted at 35° C. has a polydispersity index (Mw/Mn) in a range of about 3.0 to about 5.0.

11. The copolymer of claim 1, wherein the copolymer has OIT of at least 120 mins as measured according to ASTM D3895.

12. The copolymer of claim 1, wherein a tensile elongation at break of resin plaque is at least 700% according to ASTM D638.

13. The copolymer of claim 1, wherein a tensile strength at yield of resin plaque is at least 1500 psi according to ASTM D638.

14. The copolymer of claim 1, wherein an ESCR of resin plaque is at least 3000 hours for both conditions B and C according to ASTM D1693.

15. The copolymer of claim 1, wherein a hardness of resin plaque is at least 50 Shore-D according to ASTM D2240.

16. The copolymer of claim 1, wherein a flexural modulus of resin plaque is at least 55 kpsi according to ASTM D790.

17. The copolymer of claim 1, wherein the copolymer is produced by reacting ethylene and an alpha-olefin comonomer at reaction temperature in a range of 50° C. to 100° C. in the presence of titanium-based Ziegler-Natta catalyst.

18. A blown film comprising the copolymer of claim 1, wherein the film has a thickness in a range from about 10 to about 150 mil.

19. A cast film comprising the copolymer of claim 1, wherein the film has a thickness in a range from about 10 to about 150 mil.

* * * * *